US012805539B2

(12) United States Patent
Zier et al.

(10) Patent No.: US 12,805,539 B2
(45) Date of Patent: Nov. 24, 2026

(54) SYSTEM AND METHOD FOR EXTRUDING CONFECTIONERY PRODUCTS

(71) Applicant: Intercontinental Great Brands LLC, East Hanover, NJ (US)

(72) Inventors: Maxi Zier, Munich (DE); Toygun Ovul, Gebze (TR); Andre Eichler, Birmingham (GB)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 770 days.

(21) Appl. No.: 17/723,205

(22) Filed: Apr. 18, 2022

(65) Prior Publication Data

US 2022/0330569 A1 Oct. 20, 2022

Related U.S. Application Data

(62) Division of application No. 15/563,343, filed as application No. PCT/US2016/026012 on Apr. 5, 2016, now abandoned.

(60) Provisional application No. 62/143,530, filed on Apr. 6, 2015.

(51) Int. Cl.
*A23G 3/02* (2006.01)
*A23G 3/34* (2006.01)

(52) U.S. Cl.
CPC ........... *A23G 3/0242* (2013.01); *A23G 3/001* (2013.01); *A23G 3/0012* (2013.01); *A23G 3/0021* (2013.01); *A23G 3/0023* (2013.01); *A23G 3/0042* (2013.01); *A23G 3/0215* (2013.01); *A23G 3/0221* (2013.01); *A23G 3/0294* (2013.01)

(58) Field of Classification Search
CPC .... A23G 3/0242; A23G 3/001; A23G 3/0012; A23G 3/0021; A23G 3/0023; A23G 3/0042; A23G 3/0215; A23G 3/0221; A23G 3/0294
USPC .......................................................... 426/516
See application file for complete search history.

(56) References Cited

U.S. PATENT DOCUMENTS

| | | | | |
|---|---|---|---|---|
| 3,537,386 A | 11/1970 | Grosbard | | |
| 3,908,032 A | 9/1975 | Didelot et al. | | |
| 4,104,412 A | 8/1978 | Fischer et al. | | |
| 4,273,793 A | 6/1981 | Fariel et al. | | |
| 4,289,794 A | 9/1981 | Kleiner et al. | | |
| 4,925,380 A | 5/1990 | Meisner | | |
| 5,079,012 A | 1/1992 | Lengerich et al. | | |
| 5,709,012 A | 1/1998 | Ebashi | | |
| 6,180,158 B1 | 1/2001 | Zietlow et al. | | |
| 6,562,394 B1 * | 5/2003 | Volker | A23D 9/007 | 426/612 |
| 2004/0131744 A1 | 7/2004 | Kunst et al. | | |
| 2007/0087100 A1 * | 4/2007 | Fornaguera | A23G 3/54 | 426/516 |
| 2007/0141198 A1 * | 6/2007 | Yang | A23G 3/54 | 426/3 |
| 2009/0081349 A1 * | 3/2009 | Kamper | A23G 3/52 | 426/572 |
| 2010/0105847 A1 | 4/2010 | Barbieri et al. | | |
| 2011/0183049 A1 * | 7/2011 | Simbuerger | A23G 1/10 | 366/150.1 |
| 2011/0268837 A1 | 11/2011 | Jani | | |
| 2013/0302499 A1 * | 11/2013 | Lund | A23G 3/52 | 426/571 |
| 2015/0284540 A1 | 10/2015 | Kosonen et al. | | |
| 2018/0055066 A1 | 3/2018 | Zier et al. | | |

FOREIGN PATENT DOCUMENTS

| | | | | |
|---|---|---|---|---|
| CN | 104039162 A | 9/2014 | | |
| CN | 104394705 A | 3/2015 | | |
| DE | 3420026 A1 | 12/1985 | | |
| EP | 0883998 A1 | 12/1998 | | |
| EP | 1247454 A1 | 10/2002 | | |
| EP | 1919295 A2 | 5/2008 | | |
| EP | 2289346 A1 | 3/2011 | | |
| EP | 2594138 A1 | 5/2013 | | |
| JP | H0833451 A | 2/1996 | | |
| JP | 08089175 A | 4/1996 | | |
| JP | H0889175 A | 4/1996 | | |
| JP | 2002153212 A | 5/2002 | | |
| JP | 2005507251 A | 3/2005 | | |
| JP | 2013153722 A | 8/2013 | | |
| WO | WO-2007014484 A1 * | 2/2007 | | A23G 3/42 |
| WO | 2013074951 A1 | 5/2013 | | |
| WO | 2013158291 A2 | 10/2013 | | |

OTHER PUBLICATIONS

NPL Planetary extruder vs Marbit Rope (Retrieved on Apr. 23, 2025). (Year: 2025).*

PCT IPRP; International Application No. PCT/US2016/026012; International Filing Date: Apr. 5, 2016; Date of Mailing: Oct. 10, 2017; pp. 1-9.

Planetary Roller Extruder (PRE). BC 21, Nano-16-Extruder-HES-SO Valais-HEI; DIL Institute, University of Applied Sciences and Arts Western Switzerland Valais; Date of Publication: Jul. 17, 2012.

Mexico Office Action issued Apr. 11, 2022 in PCT Patent Application No. MX/a/2017/012115 (9 pages).

(Continued)

*Primary Examiner* — Erik Kashnikow
*Assistant Examiner* — Bhaskar Mukhopadhyay
(74) *Attorney, Agent, or Firm* — CANTOR COLBURN LLP

(57) ABSTRACT

A method for extruding a confectionery is provided including supplying a plurality of ingredients to a mixer. The ingredients are mixed to form a confectionery composition in said mixer. Crystals are formed in the confectionery composition while the confectionery composition is in said mixer and the confectionery composition is output from said mixer.

20 Claims, 6 Drawing Sheets

(56) References Cited

OTHER PUBLICATIONS

EP Communication Pursuant to Article 94(3) EPC (Examination Report); Application No. 16719975.1; Date of Mailing: Apr. 21, 2021; pp. 1-4.
Japanese Office Action with English Translation; JP Application No. 2020-140767; Date of Mailing: Sep. 9, 2021; pp. 1-14.
Notification of Second CN Office Action w translation; CN Application No. 201680017485.2; Date of Mailing: Apr. 7, 2021; pp. 1-11.
Chinese Office Action: International Application No. 201680017485.2; International Filing Date: Sep. 21, 2017; Date of Mailing: Apr. 30, 2020; 15 pages.
Official Action; Japanese Application No. 2017-547158; Mailing Date: Jul. 24, 2018; 8 Pages.
A. Brisset, "To Know A Lot About Sugar," Clextral Group, Development and Process, No. 12, Dec. 2004, pp. 1-2.
A. Brisset, et al., "Twin Screw Extruder in Confectionery," Spotlight on Mixing and Kneading, Part 1, Confectionery Production, Sep. 1994, 641-651, pp. 1-2.
Bosch BDK 2000 A, "Cooking Without Water," Bosch BDK 2000A Continuous System, 2000, pp. 1-7.
PCT Invitation to Pay Additional Fees and, Where Applicable, Protest Fee; International Application No. PCT/US2016/026012; International Filing Date: Apr. 5, 2016; Date of Mailing: Jul. 7, 2016, pp. 1-7.
PCT ISR Written Opinion; International Application No. PCT/US2016/026012; International Filing Date: Apr. 5, 2016; Date of Mailing: Aug. 31, 2016; pp. 1-8.
PCT Notification of Transmittal of The International Search Report; International Application No. PCT/US2016/026012; International Filing Date: Apr. 5, 2016; Date of Mailing: Aug. 31, 2016; pp. 1-8.
Japan Office Action issued Jun. 27, 2022, Application No. 2020-140767 in (11 pages).
China Office Action issued May 5, 2022, Application No. 201680017485.2 in (7 pages).
China Office Action (Notification of Reexamination) issued Nov. 21, 2025, Application No. 201680017485.2 with Common Knowledge Evidence 1: Manual of Technical Equipment for Light Industry, China Light Industry Association, China Machine Press. 1st edition in Mar. 31, 1996, pp. 903-904 (14 pages).
Indiarto et al., The Chocolate Conching Technique and Its Impact on Physicochemical Properties: A Mini-Review Int. J. Emerging Trends in Engineering Research, Jun. 2021, 785-790; 6 pages.
Marlene Stauffer, "Chocolate Processing Overview", The Manufacturing Confectioner/Oct. 1996, 51-52; 2 pages.
Notification of the Decision of Reexamination, Issued Mar. 31, 2026, CN Application No. 201680017485.2; Decision—The Request for Reexamination filed by the Requestor on Aug. 19, 2022, regarding the aforementioned patent application is hereby rejected.

* cited by examiner

SYSTEM AND METHOD FOR EXTRUDING CONFECTIONERY PRODUCTS

CROSS REFERENCE TO RELATED APPLICATIONS

This application is a divisional of U.S. patent application Ser. No. 15/563,343 filed Sep. 29, 2017, which is a National Stage Application of PCT/US2016/026012, filed Apr. 5, 2016, which claims the benefit of U.S. Provisional Patent Application No. 62/143,530 filed Apr. 6, 2015, all of which are incorporated by reference in their entirety herein.

FIELD

The disclosure generally relates to a confectionery product, and more particularly to a method for continuously forming a confectionery product via a mixer.

BACKGROUND

Comestible products such as confectioneries, and more particularly candy, are typically formed through a complex production process. Art example of a conventional process for manufacturing a confectionery product 10 is illustrated in FIG. 1. As shown, multiple ingredients are first provided to a mixer 12, where the ingredients are combined to form a slurry. This slurry is then provided to a cooker 14 where the ingredients are further mixed and heated via art application of steam. As a result of the added heat, one or more of the ingredients may dissolve and moisture may be removed from the composition, resulting in a more viscous composition. After being cooled by a cooling mechanism 16, such as a cooling tunnel or a cooling drum, to a temperature of about 70° C., the composition is provided to another mixer 18 where one or more additional ingredients including color and flavor are added. The composition is again cooled via a cooling belt and is further mixed and formed within a thrilling extruder 20. The confectionery extrudate is output from the extruder 20 at a temperature of about 45° C. and in one or more pieces having a desired shape. The extrudate is cooled prior to being supplied to a packaging station 22 where the extrudate is cut, wrapped, and packaged.

In embodiments where the confectionery is a crystallized and aerated confectionery, the production process further includes seeding the composition with a crystallization aid, such as citric acid for example, and then supplying the composition to a pulling machine configured to repeatedly stretch the composition upstream from the extruder 20. Together the crystallization aid and the work generated by the pulling machine initiate crystallization of the composition. Only after crystallization has begun is the composition supplied to a cooling mechanism, such as a cooling belt, and then to an extruder for forming into a desired shape.

In embodiments where the confectionery is a crystallized non-aerated confectionery, the production process further includes supplying the composition to additional mixing step after the first cooling and before color and flavor addition to apply mechanical energy to the confectionery mass to crystallize it.

In embodiments where the confectionery is a non-crystallized, aerated confectionery, the production process further includes supplying the composition to a pulling machine configured to repeatedly stretch the composition upstream from the extruder. Composition temperatures of around 30° C. are required to form it into its desired form.

As illustrated, these production processes have a substantial number of production steps, requiring multiple pieces of machinery and a large amount of space for operation. Many of these pieces of equipment require manual labor for operation, thereby resulting in high labor costs and ultimately, higher product costs. In addition, substantial variation commonly occurs between confectionery products within the same batch and different batches as a result of this manual labor.

Further, in typical confectionery production, there is usually a need to allow the final product to set or cool. In some situations, only after the confectionery has settled for the required period of time can it then be packaged for distribution. This lengthy period of time is undesirable, as it greatly slows down the process of making and processing confectionery products.

SUMMARY

According to an embodiment of the present disclosure, a method for extruding a confectionery is provided including supplying a plurality of ingredients to a mixer. The ingredients are mixed to form a confectionery composition in said mixer. Crystals are formed in the confectionery composition while the confectionery composition is in said mixer and the confectionery composition is output from said mixer.

In addition to one or more of the features described above, or as an alternative, in further embodiments said mixer is a planetary roller extruder.

In addition to one or more of the features described above, or as an alternative, in further embodiments the confectionery is a soft, chewy candy.

In addition to one or more of the features described above, or as an alternative, in further embodiments the confectionery is a hard candy.

In addition to one or more of the features described above, or as an alternative, in further embodiments said confectionery composition is sized.

In addition to one or more of the features described above, or as an alternative, in further embodiments no additional sizing of the confectionery composition occurs after being output from said mixer.

In addition to one or more of the features described above, or as an alternative, in further embodiments said confectionery composition is output from said mixer directly to a packaging station.

In addition to one or more of the features described above, or as an alternative, in further embodiments no additional treatment of the confectionery occurs after being output from said mixer.

In addition to one or more of the features described above, or as an alternative, in further embodiments the plurality of ingredients include at least one of sugar, polyol, glucose, fat, color, and flavor.

In addition to one or more of the features described above, or as an alternative, in further embodiments the plurality of ingredients do not include an emulsifier.

In addition to one or more of the features described above, or as an alternative, in further embodiments the plurality of ingredients further include at least one of water, an emulsifier, a hydrocolloid, and an acid.

In addition to one or more of the features described above, or as an alternative, in further embodiments the confectionery composition is aerated within said mixer to control a density thereof.

In addition to one or more of the features described above, or as an alternative, in further embodiments said density of said confectionery composition is less than or equal to about 0.8 g/cc.

In addition to one or more of the features described above, or as an alternative, in further embodiments aerating said confectionery composition includes inputting a stream of gas into said confectionery composition.

In addition to one or more of the features described above, or as an alternative, in further embodiments said gas is an inert gas.

In addition to one or more of the features described above, or as an alternative, in further embodiments said gas is air.

In addition to one or more of the features described above, or as an alternative, in further embodiments forming crystals in said confectionery composition occurs as a result of mechanical shear generated by said mixer when said confectionery composition is at a given temperature.

In addition to one or more of the features described above, or as an alternative, in further embodiments said confectionery composition is heated within said mixer.

In addition to one or more of the features described above, or as an alternative, in further embodiments cooling said confectionery composition occurs downstream from said heating said confectionery composition.

In addition to one or more of the features described above, or as an alternative, in further embodiments the confectionery is configured as one of a plurality of layers of a multilayer confectionery.

In addition to one or more of the features described above, or as an alternative, in further embodiments combining the confectionery with another of said plurality of layers of said multilayer confectionery occurs before the confectionery is exposed to an atmosphere.

In addition to one or more of the features described above, or as an alternative, in further embodiments an elapsed time between supplying said plurality of ingredients to said mixer and outputting said confectionery composition from said mixer is less than 20 minutes.

In addition to one or more of the features described above, or as an alternative, in further embodiments said elapsed time is less than 10 minutes.

In addition to one or more of the features described above, or as an alternative, in further embodiments said elapsed time is less than 5 minutes.

In addition to one or more of the features described above, or as an alternative, in further embodiments said confectionery composition is a first confectionery composition. A second confectionery composition is output from said mixer following said outputting of said first confectionery composition. The second confectionery composition is output absent a formation of crystals.

In addition to one or more of the features described above, or as an alternative, in further embodiments said mixer includes a substantially identical configuration when used to form said first confectionery composition and said second confectionery composition.

In addition to one or more of the features described above, or as an alternative, in further embodiments said mixer includes a first configuration when used to form said first confectionery composition and a second configuration when used to form said second confectionery composition. The second configuration is different than said first configuration.

In addition to one or more of the features described above, or as an alternative, in further embodiments said mixer includes a plurality of screws. A configuration of said plurality of screws varies between said first configuration and said second configuration.

According to another embodiment of the present disclosure, a method for manufacturing a confectionery is provided including mixing a plurality of ingredients in a mixer to form a confectionery composition. The confectionery composition is output from said mixer having a density less than or equal to about 0.8 g/cc. The mixer has a length less than or equal to about fifteen meters.

In addition to one or more of the features described above, or as an alternative, in further embodiments said density of the confectionery is controlled by inputting a stream of gas into said confectionery composition within said mixer.

In addition to one or more of the features described above, or as an alternative, in further embodiments said mixer is a planetary roller extruder.

In addition to one or more of the features described above, or as an alternative, in further embodiments said confectionery is a soft chewy candy.

According to yet another embodiment of the present disclosure, a method of manufacturing a confectionery product is provided including mixing a plurality of ingredients in a planetary roller extruder to form a confectionery composition. The confectionery composition is output from the planetary roller extruder for use in the confectionery product. A cross-section of the confectioner composition output from the planetary roller extruder is substantially equal to a cross-section of the confectionery product.

In addition to one or more of the features described above, or as an alternative, in further embodiments said planetary roller extruder includes a melt pump.

In addition to one or more of the features described above, or as an alternative, in further embodiments said cross-section of said output confectionery composition is controlled via a die.

In addition to one or more of the features described above, or as an alternative, in further embodiments no additional sizing of said output confectionery composition occurs.

In addition to one or more of the features described above, or as an alternative, in further embodiments moisture is removed from the confectionery composition during the mixing within the planetary roller extruder absent any boiling of said plurality of ingredients.

In addition to one or more of the features described above, or as an alternative, in further embodiments said moisture is configured to vent from said confectionery composition via an opening formed in said planetary roller extruder.

In addition to one or more of the features described above, or as an alternative, in further embodiments a pump is configured to draw moisture from said confectionery composition via an opening formed in said planetary roller extruder.

In addition to one or more of the features described above, or as an alternative, in further embodiments said confectionery is a soft chewy candy.

According to yet another embodiment of the invention, a method of manufacturing a confectionery is provided including mixing a plurality of ingredients to form a confectionery composition in a mixer. The confectionery composition is heated within a first portion of the mixer and is cooled within a second portion of the mixer. The confectionery composition is cooled a temperature less than about 80° C.

In addition to one or more of the features described above, or as an alternative, in further embodiments said confectionery composition is cooled to a temperature between about 70° C. and about 80° C.

In addition to one or more of the features described above, or as an alternative, in further embodiments, the confectionery is a hard candy.

In addition to one or more of the features described above, or as an alternative, in further embodiments, said confectionery composition is cooled to a temperature between about 30° C. and about 50° C.

In addition to one or more of the features described above, or as an alternative, in further embodiments, the confectionery is a soft, chewy candy.

In addition to one or more of the features described above, or as an alternative, in further embodiments, said mixer is a planetary roller extruder.

According to yet another embodiment, a method for manufacturing a confectionery is provided including mixing a plurality of ingredients input into a single extruder into a confectionery composition. The single extruder is less than or equal to about fifteen meters in length. The confectionery composition is output from the single extruder at a rate of at least one ton per hour.

In addition to one or more of the features described above, or as an alternative, in further embodiments said confectionery is a soft chewy candy.

In addition to one or more of the features described above, or as an alternative, in further embodiments said confectionery is a hard candy.

According to another embodiment, a system for manufacturing a confectionery is provided including a mixer having a plurality of rotatable screws arranged therein. The mixer is less than or equal to about fifteen meters in length and is configured to mix a plurality of ingredients into a confectionery composition. An aeration unit is coupled to the mixer. The aeration unit is configured to input a stream of gas into the confectionery composition such that the confectionery composition has a density of less than or equal to about 0.8 g/cc.

In addition to one or more of the features described above, or as an alternative, in further embodiments said gas is an inert gas.

In addition to one or more of the features described above, or as an alternative, in further embodiments said gas is air.

In addition to one or more of the features described above, or as an alternative, in further embodiments said mixer is a planetary roller extruder.

In addition to one or more of the features described above, or as an alternative, in further embodiments wherein the confectionery is a soft, chewy candy.

According to yet another embodiment, a method of manufacturing a plurality of confectioneries simultaneously is provided including supplying a plurality of ingredients to a mixer. The ingredients are mixed to forma confectionery composition in the mixer. A first portion of the confectionery composition is pumped into a first static mixer and a second portion of the confectionery composition is pumped into a second static mixer. The first portion of confectionery composition and the second portion of the confectionery composition are output from the mixer independently.

In addition to one or more of the features described above, or as an alternative, in further embodiments at least one ingredient is added to said first portion upstream from said first static mixer.

In addition to one or more of the features described above, or as an alternative, in further embodiments at least one of a color and flavor of said first portion of confectionery composition is distinct from said second portion of confectionery composition.

In addition to one or more of the features described above, or as an alternative, in further embodiments said first portion of said confectionery composition is a first soft chewy candy and said second portion of said confectionery composition is a second soft chewy candy.

In addition to one or more of the features described above, or as an alternative, in further embodiments said first portion of said confectionery composition is a first hard candy and said second portion of said confectionery composition is a second hard candy.

In addition to one or more of the features described above, or as an alternative, in further embodiments said mixer is a planetary roller extruder.

BRIEF DESCRIPTION OF THE DRAWINGS

The accompanying drawings incorporated in and forming a part of the specification embodies several aspects of the present invention and, together with the description, serve to explain the principles of the invention. In the drawings.

The detailed description explains embodiments of the invention, together with advantages and features, by way of example with reference to the drawings.

DETAILED DESCRIPTION

Figure 1:
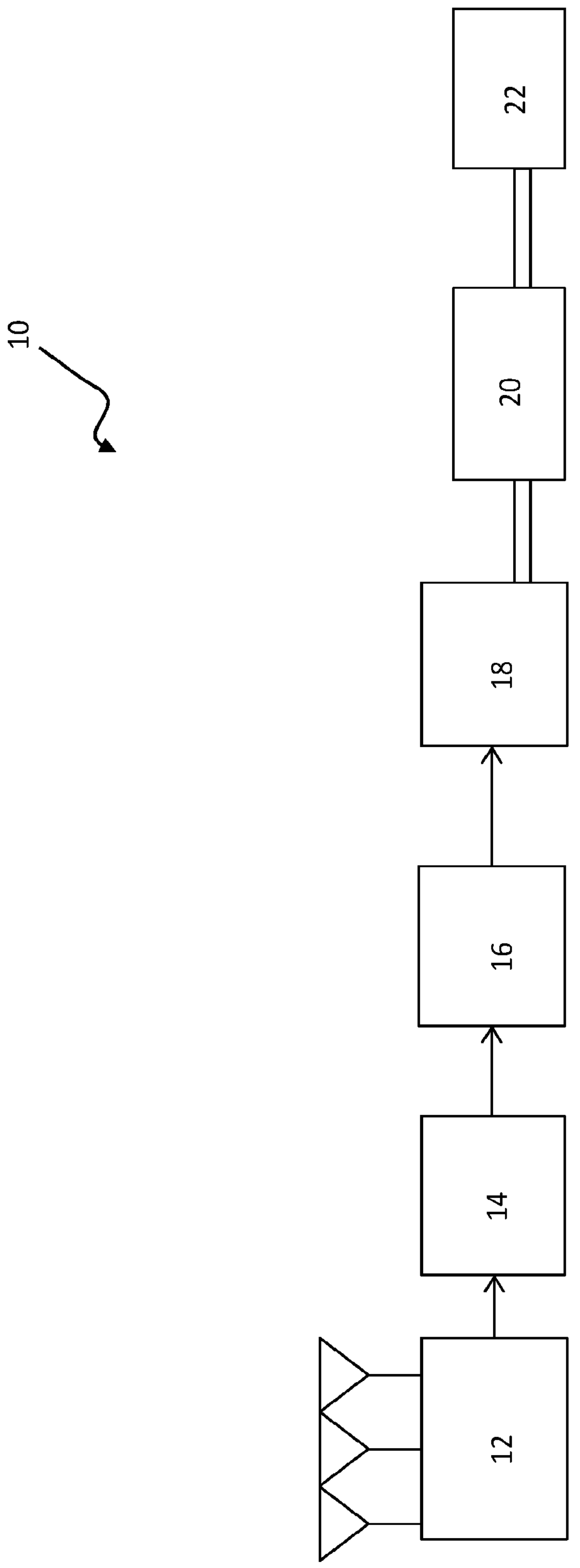
FIG. 1 is schematic diagram of an example of a conventional process for manufacturing a confectionery product.
Figure 2:
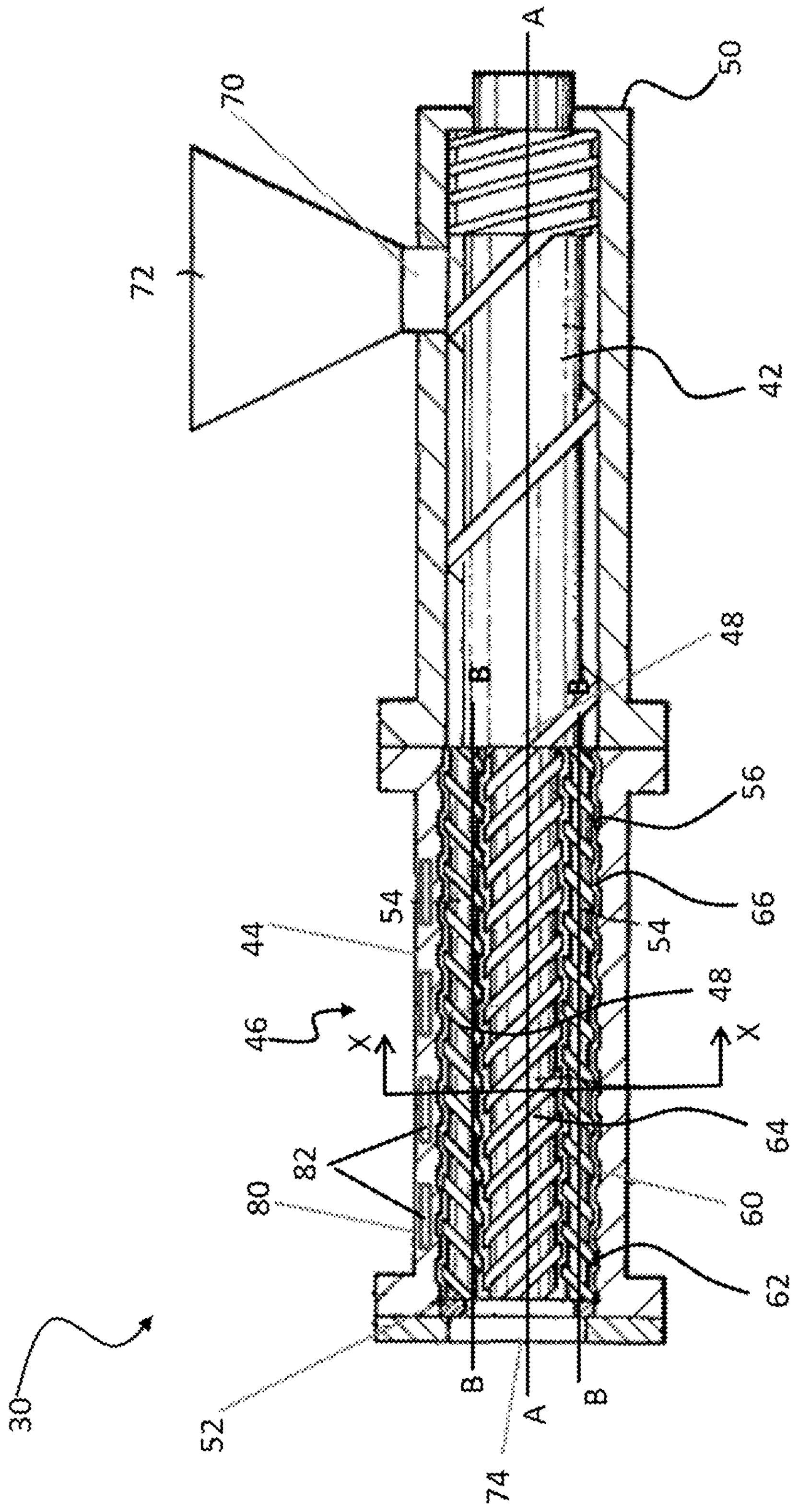
FIG. 2 is a cross-sectional view of a confectionery mixer according to an embodiment of the invention.
Figure 3:
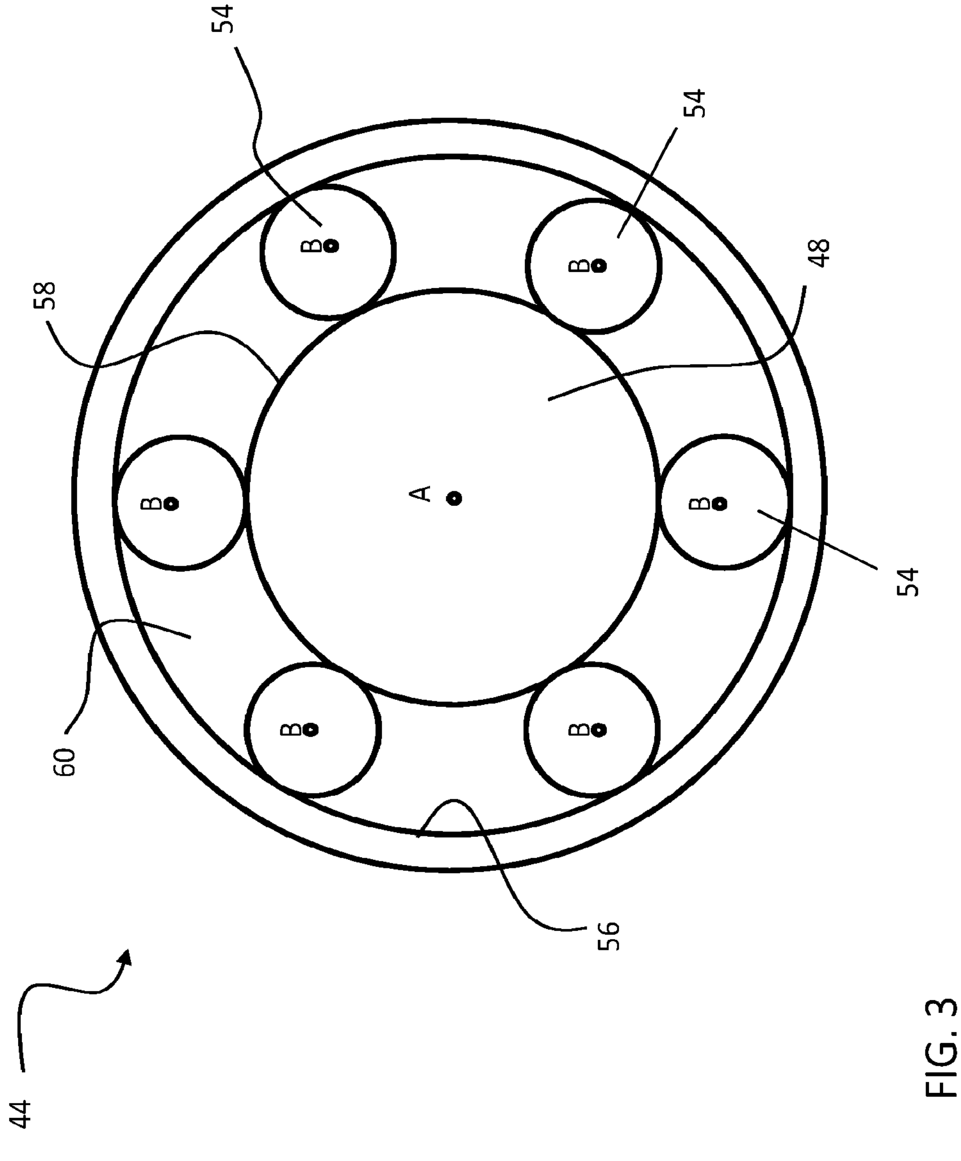
FIG. 3 is a cross-sectional view of the confectionery mixer taken line X-X of FIG. 2 according to an embodiment of the invention.
Figure 4:
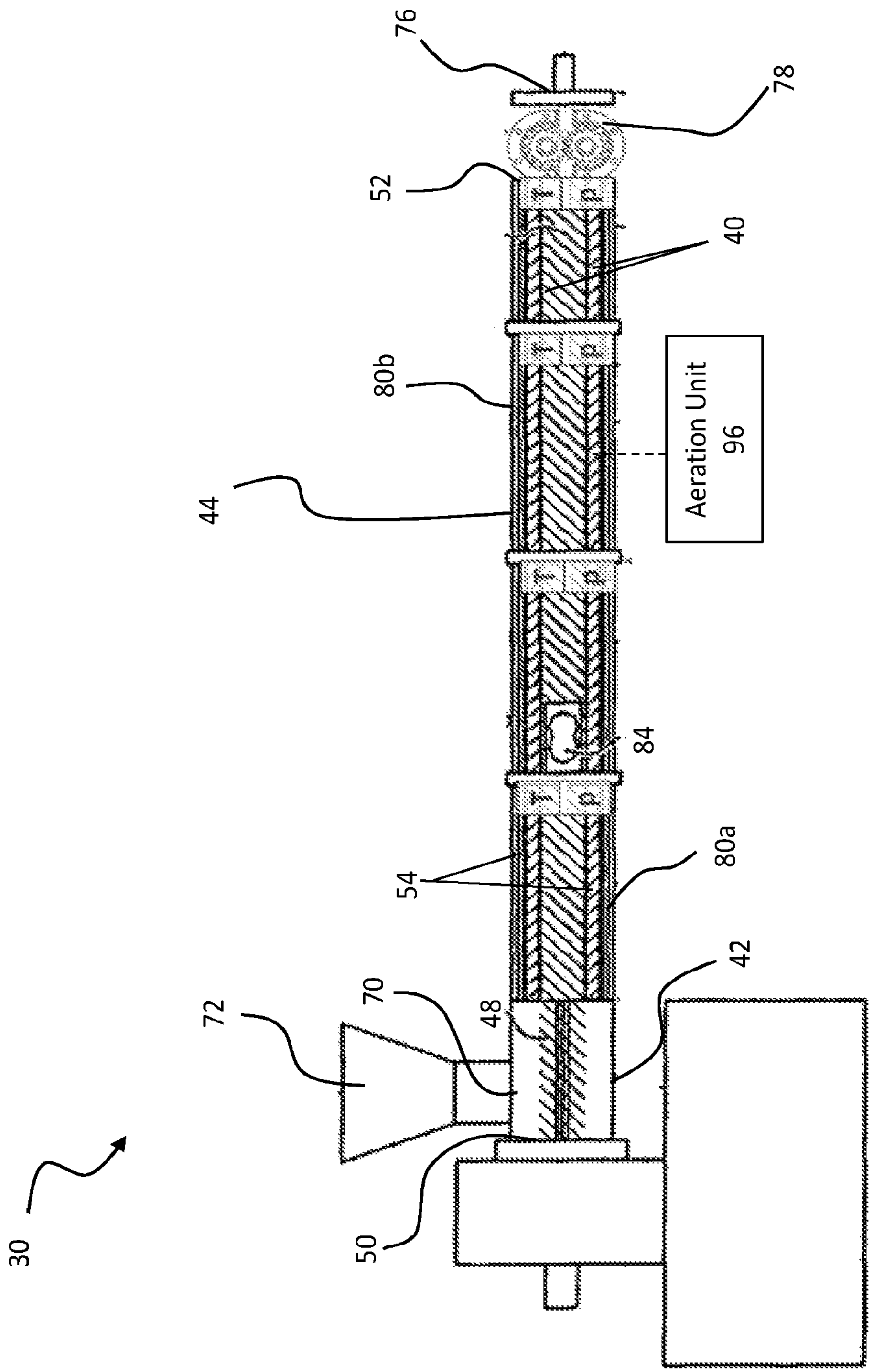
FIG. 4 is a cross-sectional view of a confectionery mixer according to another embodiment of the invention.

Referring now to FIGS. 2-4, a mixer or extruder 30 for forming a comestible, such as a confectionery, or more particularly a hard candy or soft candy, is illustrated. Examples of confectioneries include, but are not limited to soft chewy candy and hard candy. Though the extrudate or pieces of comestible discussed herein may include any type of edible product, for ease of description, the extrudate will be discussed herein below as a confectionery or candy.

As shown in the figures, the mixer 30 may be a single mixing device including a feed section 42 and a mixing barrel 44. Of course, it is understood that the mixing barrel 44 may include one or more coupled barrel sections 46. The term "barrel section" as used herein may refer to a single barrel, multiple grouped barrels, or a chosen portion of a single barrel.

In the illustrated, non-limiting embodiment of FIGS. 2 and 3, the mixer 30 is a planetary roller extruder having a rotatable center shaft 48 that extends generally from a feed end 50 to an opposite, extrusion end 52 of the mixer 30. Because different areas of the mixer 30 may be configured to perform different functions, the center shaft 48 may include different diameters or configurations at various portions of the mixer 30.

The planetary roller extruder 30 additionally includes a plurality of rotatable planetary screws 54 arranged within one or more of the barrel sections 46. As best shown in FIG. 3, these screws 54 are arranged about the center shaft 48 and facilitate mixing of a plurality of confectionery ingredients within at least one of the barrel sections 46. The planetary screws 54 are rotatable about an axis A of the center shaft 48 in the same direction of rotation as the center shaft 48, and are rotatable about their own axes B in a direction opposite the rotation of the center shaft 48. The number of screws 54 used in the planetary roller extruder 30 depends on the particulars of the confectionery being manufactured, with two or more screws 54 being used in each barrel section 46. In embodiments having a plurality of connected barrel sections 46, the number of screws 54 within each barrel section 46, may be identical, or alternatively, may be different.

An inner wall 56 of the mixing barrel 44 and an outer surface 58 of the central shaft 48 combine to form a mixing annulus 60 (FIG. 3), in which the screws 54 are disposed, and a confectionery composition will flow and be mixed. Within this annulus 60, each of the screws 54, center shaft 48, and wall 56 include, corresponding or mate-able grooving or flights 62, 64, 66. These flights 62, 64, 66 assist in efficiently mixing the confectionery composition flowing through the extruder 30. The screws 54 may have any desirable flight configuration (i.e. variance in the gaps between the flights, flight shape, flight length, etc.), which will therefore create variation in the corresponding flights of the center shaft 48 and wall 56.

The planetary roller extruder 30 illustrated and described herein is intended only as an example. It should be appreciated that other types of mixers or extruders, such as a twin screw extruder for example, may be desirable for use in the below discussed systems and methods for extruding a confectionery. However, the below will be described with reference to a planetary roller extruder as shown in FIGS. 2-5.

The planetary roller extruder 30 includes at least one point of entry 70 for supplying ingredients to the planetary roller extruder 30. For example, a point of entry 70 is typically located in the feed section 42, or downstream from the feed section 42 in one of the barrel sections 46 of the mixing barrel 44. Alternatively, or in addition, one or more point of entry 70 may be located at the connection between adjacent barrel sections 46. The position of these points of entry 70 is selected depending on the application, the ingredient being added, and the form of the ingredient being added. Various types of feed inlets 72 may be arranged at each of the points of entry 70 to supply one or more ingredients to the inner volume of the planetary roller extruder 30. One type of feed inlet 72 is a gravity driven hopper/feeder. Other feed inlets 72 include a side feed inlet configured to provide a supply of one or more ingredients laterally to a side of the planetary roller extruder 30.

An extrusion point 74 is arranged at the extrusion end 52 of the planetary roller extruder 30, adjacent a downstream end of the screws 54 and/or central shaft 48. An extruder die 76 is fluidly coupled to the extrusion end 52 of the mixing barrel 44 such that the confectionery composition dispelled therefrom has a shape complementary to the die 76. In one embodiment, a melt pump or other gear pump 78 is positioned between the extrusion end 52 and the extrusion die 76. The melt pump 78 is configured to assist in the extrusion of a confectionery product by receiving the unformed confectionery composition from the extrusion end 52 and providing it with a desired pressure to the extrusion die 76.

The planetary roller extruder 30 additionally includes at least one temperature control system 80 configured to efficiently control a temperature of the confectionery composition being mixed within the planetary roller extruder 30. An example of a temperature control system 80 includes one or more fluid channels running longitudinally or circumferentially through at least one of a portion of the mixing barrel 44, the central shaft 48. In one embodiment, the temperature control system 80 is configured to heat the confectionery composition within a portion of the mixing barrel 44, such as a portion directly downstream from the feed section 42 for example. Alternatively, or in addition, the temperature control system 80 may be configured to cool the confectionery composition within a portion of the mixing barrel 44.

The planetary roller extruder 30 is additionally configured to remove moisture in the form of vapor, such as water for example, from the confectionery composition as it is being formed therein through an opening or vent 84 arranged in a portion of the mixing barrel 44 or at an interface between adjacent barrel sections 46. The opening 84 may, but need not be arranged within the same portion of the mixing barrel 44 to which the at least one temperature control system 80 is applied. In one embodiment, a vacuum or other pump (not shown) is fluidly coupled to the opening 84 and is configured to draw an increased amount of moisture from the interior of the planetary roller extruder 30, and the confectionery composition located therein.

As shown, formation of a confectionery, such as a soft, chewy candy or a hard candy for example, may occur entirely within the planetary roller extruder 30. To form a confectionery, multiple ingredients are added to the planetary roller extruder 30, such as via a feed inlet 72 operably coupled to the feed section 42. The plurality of ingredients may be added via one or more feed inlets 72 disposed at the same entry point 70 or at different entry points 70 of the planetary roller extruder 30, thereby allowing for varying durations of mixing of the ingredients. The ingredients may be added in a variety of forms, including but not limited to, powder, liquid, flake, or a molten form for example. The ingredients added to the planetary roller extruder 30 will vary depending on the confectionery being formed. Typical ingredients added to the planetary roller extruder 30 to form a soft, chewy candy or a hard candy include, but are not limited to sugar, polyol, glucose, fat, color, and flavor. In addition, one or more of water, an emulsifier, a hydrocolloid, and an acid may be added to any point of entry 70 of the planetary roller extruder 30 during the formation of a confectionery.

In addition to the screw design, rotation of the central shaft 48 about axis A, and the plurality of screws 54 about axis A and their respective axes B, causes a directional flow of the mixture of the ingredients towards the extrusion point 52 of the mixing barrel 44. As the confectionery ingredients move away from the feed section 42 of the extruder 30, the shaft 48 and rotating screws 54 mix the ingredients via movement of the flow through the spaces 60 defined between the flights 62, 64, 66 of the rotating screws 54, center shaft 48 and wall 56. As the ingredients are conveyed and mixed, the ingredients form a confectionery composition.

As the confectionery composition passes through a portion of the mixing barrel 44, to which a first temperature control system 80*a* is applied, the temperature of the confectionery composition changes. For example, during formation of a soft, chewy candy, the confectionery composition within a corresponding portion of the mixing barrel 44 is heated by the first temperature control system 80*a* to a temperature between about 110° C. and 145° C. Similarly, during the formation of a hard candy, the confectionery composition is heated by the first temperature control system 80*a* to a temperature between about 140° C. and 155° C. In the illustrated, non-limiting embodiment, the temperature control system 80*a* is configured to heat the confectionery composition by circulating a hot fluid, such as water, steam, or oil having a temperature of about 150° C. for example, through the one or more fluid channels 82 formed in one or more barrels sections 46 of the planetary roller extruder 30. In addition, the mechanical work generated as the rotating screws 54 mix the confectionery composition contributes to heating the confectionery composition within the planetary roller extruder 30. As heat transfers from the hot fluid to the adjacent confectionery composition, the heat helps dissolve one or more of the ingredients therein, for example sugar.

As the confectionery composition passes opening 84 in the mixing barrel 44, a desired amount of moisture is removed from the confectionery composition. The amount of moisture removed is dependent on the type of confectionery being formed, the added ingredients, the form of the added ingredients, and the extrusion parameters. For example, when the planetary roller extruder 30 is used to form a soft chewy candy, about 6-9% of the final confectionery composition output from the extruder 30 is moisture whereas when the planetary roller extruder 30 is used to form a hard candy only about 1-3% of the final confectionery composition output from the extruder 30 is moisture. In the illustrated, non-limiting embodiment, the opening 84 is positioned within a same barrel section 46 as the first temperature control system 80*a* such that heating and dehydration of the confectionery composition occur simultaneously. As a result of this combined heating and moisture removal within the planetary roller extruder 30, the need to boil the confectionery composition to dissolve one or more ingredients and remove moisture therefrom that exists in conventional confectionery manufacturing processes is eliminated.

In the simplest operation of the planetary roller extruder 30, after being heated and having moisture removed therefrom, the mixed confectionery composition is provided to the extrusion point 52 adjacent the downstream ends of the screws 54 and the center shaft 48. Extrudate of a final confectionery composition 32 is expelled from the extruder 30 via the extruder die 76 in a desired shape complementary to the extruder die 76, such as one or more ropes or strands. The ropes may be of any shape or size desired, including circular, rectangular, or any other formation desired, and typically have a substantially constant cross-sectional area.

In one embodiment, the extruder die 76 is configured such that the size of the confectionery extrudate 32, such as a diameter, width, and/or thickness for example, is substantially identical to a finalized confectionery product. As a result, aside from cutting the extrudate into individual pieces, no further sizing of the extrudate 32 is necessary prior to packaging the confectionery. In addition, the extrudate 32 output from the planetary roller extruder 30 may be considered "consumer ready" such that no further treatment or other processes need be applied to the extrudate prior to consumption.

Figure 5:
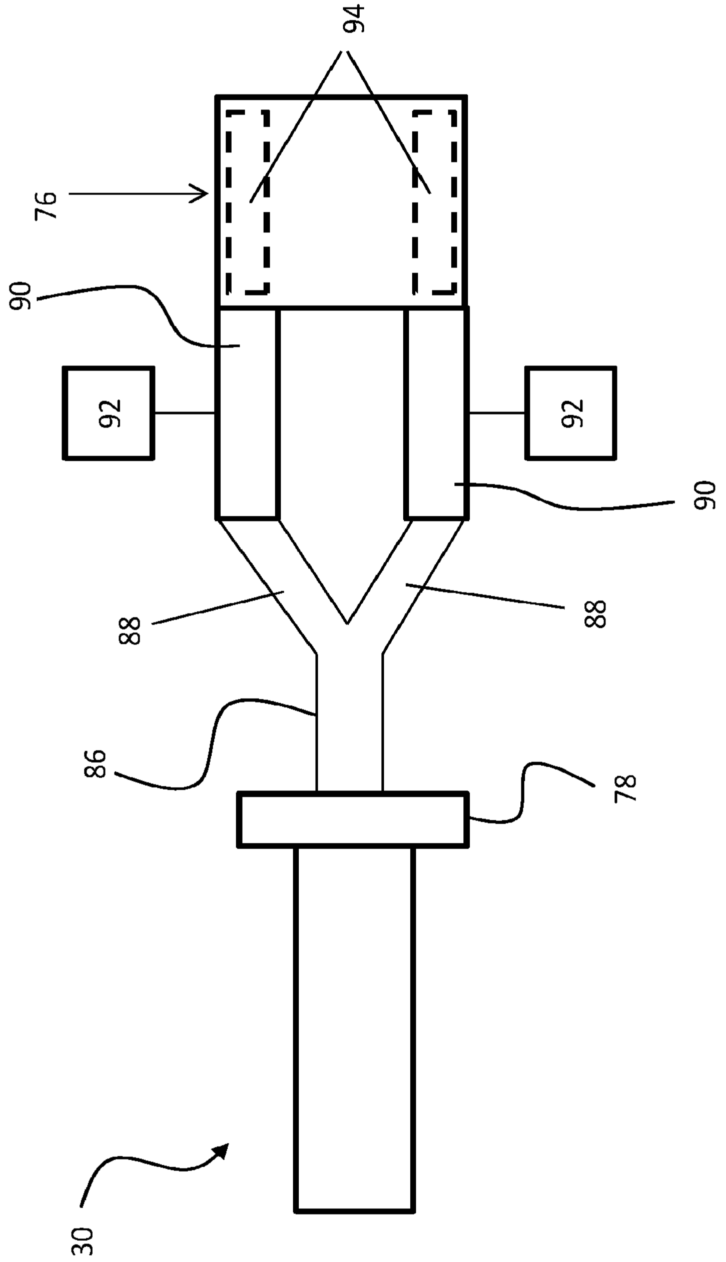
FIG. 5 is a top view of a confectionery mixer according to yet another embodiment of the invention.

Alternatively, as shown in FIG. 5, a melt pump 78 may be mounted at the extrusion end 52 of the extruder 20 and is configured to move the composition into an adjacent conduit 86 having multiple flow channels 88 with a consistent flow rate. As a result of the pressure drop within the channels 88, the composition will be directed simultaneously into the plurality of channels 88 of the conduit 86. Each respective flow channel 88 is connected to a block 90, such that a color and/or flavor is added to the portion of confectionery composition disposed therein via a liquid dosing system 92. From the block 90, each flow of confectionery composition is supplied to a respective static mixer 94 arranged within the extruder die. The static mixer 94 is configured to mix the confectionery composition to evenly distribute the color and or flavor before the composition is extruded through an opening in the die having a desired shape. Accordingly, in such embodiments, the extruder is configured to generate multiple confectionery products differing in at least one of color and flavor simultaneously.

In another embodiment, the planetary roller extruder 30 may additionally include an aeration unit 96 configured to supply a gas, such as an inert gas or dry air for example, into a respective portion of the planetary roller extruder 30. In the illustrated, non-limiting embodiment, the aeration unit 96 is arranged in a portion of the mixing barrel 44 downstream from the moisture removal Opening 84. However, in other embodiments, the aeration unit 96 may be arranged at any location within the mixing barrel 44. The amount of gas added to the confectionery composition directly controls a reduction in the density of the confectionery composition.

Because injection of a stream of gas via the aeration unit 96 provides not only an increased amount of gas, but also more accurate control of the density than conventional pulling mechanisms, a confectionery composition having a density less than or equal to 0.8 g/cc may be achieved. In addition, it would be very difficult (if possible at all) to use a twin screw extruder with a length identical to the planetary roller extruder to achieve a homogeneously mixed confectionery composition having a density less than or equal to about 0.8 g/cc. Due to the reduced number of screws and the temperature limitations of a twin screw extruder, the amount of time required to adequately cool the confectionery composition would exceed the time that the injected gas would remain trapped within the composition.

Alternatively, or in addition, the planetary roller extruder 30 may include a second temperature control system 80*b* configured to alter the temperature of the confectionery composition within another portion of the mixing barrel 44. The second temperature control system 80*b* may be separate from or may be integrally formed with the first temperature control system 80*a*. As the confectionery composition flows through a corresponding portion of the mixing barrel 44, such as a barrel section 46 downstream from the first temperature control system 80*a* for example, the confectionery composition is cooled. In the illustrated, non-limiting embodiment, the second temperature control system 80*b* is configured to cool the confectionery composition by circulating a cool fluid, such as refrigerant or glycol having a temperature of about −30° C. for example. In embodiments where the confectionery being formed is a soft chewy candy, the confectionery composition is generally cooled to about 30° C.-50° C. However, if the confectionery being formed is a hard candy, the confectionery composition is generally cooled to about 70° C.-80° C.

The planetary roller extruder 30 may also be used to form a confectionery having a greater range of parameters than confectioneries formed using conventional manufacturing methods and equipment. Adjustable parameters that are known to affect the confectionery being formed include, but are not limited to, individual and planet rotational speed of the screws 54, the number of screws 54, the configuration of the screws 54, temperature, gas addition, moisture removal, and sugar type. Because modification of one or more of these parameters may significantly impact the final confectionery composition, the mixer 30 disclosed herein provides for substantial flexibility in the final confectionery composition. For example, the planetary roller extruder 30 is configured to produce a confectionery having a hardness between about 150 and 20000 g, a stickiness between about −180 and −1 g·sec, a graininess between about no grains/crystals and a high amount of grains/crystals presents with the crystal size up to 100 μm in having any shape such as rod-pallet like, round, etc. and a density between about 0.5 and 1.6 g/cm$^3$.

As a result of the lower surface area of a conventional twin screw extruder compared to a planetary roller extruder, it will be difficult, if possible at all, to efficiently cool a confectionery composition therein to a temperature sufficient to initiate crystallization, even with the application of a cooling temperature control system. Use of a planetary roller extruder 30 in conjunction with the second temperature control system 80*b*, however, allows the confectionery composition therein to be cooled to a temperature lower than may be achieved by other extruders or mixers. As a result, the mechanical shear generated by screws 54 of the extruder 30 when the composition is at a desired cool temperature causes the formation of crystals within the confectionery composition. Therefore, in embodiments where the mixer 30 is a planetary roller extruder, the planetary roller extruder 30 may be configured to make both a non-crystallized and crystallized confectioneries.

In some embodiments, a transition between forming a non-crystallized confectionery and a crystallized confectionery may be achieved without modifying the components of the mixer 30. For example, crystallization of the confectionery may be controlled based on the heat transfer that occurs between the hot confectionery composition and the cold refrigerant of the second temperature control system 80*b*. In such embodiments, the confectionery composition need not be seeded with a crystallization aid, such as a citric acid for example. Alternatively, or in addition, the mixer 30 may be easily adapted to produce a crystallized confectionery, such as by changing a configuration of the screws 54 within the planetary roller extruder 30 for example.

Formation of a confectionery product using the planetary roller extruder 30 disclosed herein eliminates the need for multiple pieces of machinery, such as a sugar dissolving unit, buffer tank, one or more cookers, a mixer, a pulling mechanism, and one or more cooling machines. Similarly, depending on the confectionery being formed, and therefore the ingredients being added, the ingredients may not need to be pre-mixed and water may not need to be added thereto prior to feeding the ingredients into the inlet 58. Operation of the planetary roller extruder 30 requires minimal manual labor, thereby reducing costs and increasing product reliability. In addition, because extruders are typically self-cleaning, any changeover in the machinery of the mixer 30 required between the formation of a first confectionery and a second confectionery is minimized and may occur within a limited period of time, for example half an hour.

Formation of a confectionery using the planetary roller extruder 30 as described herein is more efficient than conventional manufacturing processes. Because the entire formation of the confectionery occurs within a single machine, the length and overall footprint of the manufacturing system is significantly reduced, such as to a length less than or equal to fifteen meters, such as twelve meters for example. This reduction in equipment not only limits the exposure of the ingredients and confectionery composition to the atmosphere and external influences during formation, thereby making the resultant confectionery more sanitary, but also additionally decreases the time required to form a confectionery product. In one embodiment, the time elapsed from the initial input of ingredients to output from the extruder die 76 is less than 20 minutes, 10 minutes, or more particularly less than 5 minutes or even 1 minute. As a result, the overall throughput of the mixer 30 is increased to a rate of at least greater than one ton per hour. The throughput of conventional extruders, such as a twin screw extruder for example, typically depends in part on the overall length of the extruder. Accordingly, a twin screw extruder having a length less than or equal to fifteen meters would not be able to achieve a comparable throughput.

Figure 6:
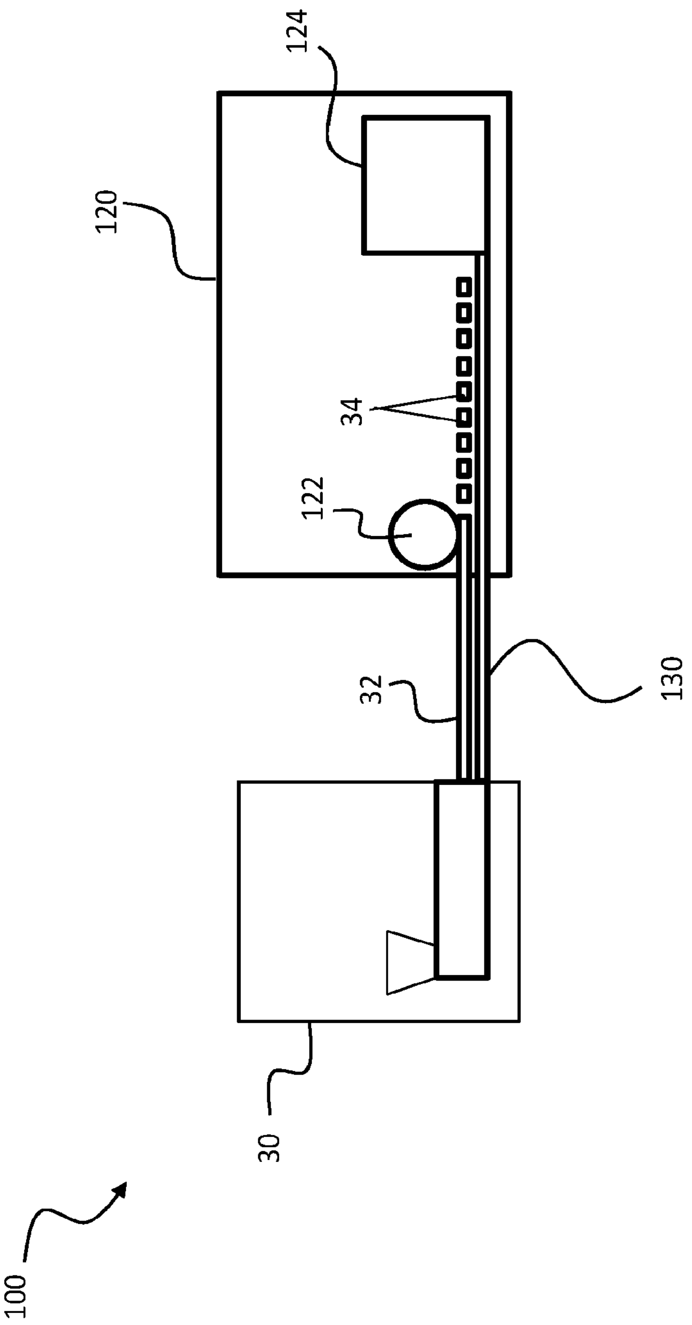
FIG. 6 is a schematic diagram of a system for manufacturing a confectionery according to an embodiment of the invention.

Referring now to FIG. 6, the planetary roller extruder 30 may be part of a system 100 for manufacturing a confectionery. In one embodiment, such as during the manufacturing of a hard candy for example, a downstream processing station 120 configured to further process the confectionery extrudate 32 is a cooling tunnel or other device configured to further cool the temperature of the confectionery extrudate 32. In another embodiment, the downstream processing station 120 may include cutting and packaging equipment. As shown in the non-limiting embodiment illustrated in FIG. 5, the cutting and packaging equipment may include a cutting device 122 configured to cut the confectionery extrudate 32, for example into a plurality of individual pieces 34. The plurality of cut pieces 34 may be provided to a packaging machine 124 configured to then wrap the cut pieces 34 individually or in groups to form a packaged confectionery product.

Alternatively, the output confectionery extrudate 32 may comprise one of a plurality of layers of a multilayer confectionery or comestible. For example, the downstream processing station 120 may include a combining block within which the extrudate 32 from the planetary roller extruder 30 and a second material are combined without exposing the extrudate 32 to the atmosphere.

The planetary roller extruder 30 may be located in one plant and the downstream processing station 120 may be located in a different plant wherein the confectionery extrudate 32 is transferred from one plant to the other for subsequent processes. Alternatively, the planetary roller extruder 30 may be coupled to and arranged in-line with the downstream processing station 120 such that the extrudate 32 from the planetary roller extruder 30 is delivered directly to the downstream processing station 120 by a transport device 130, such as a conveyor for example.

All references, including publications, patent applications, and patents cited herein are hereby incorporated by reference to the same extent as if each reference were individually and specifically indicated to be incorporated by reference and were set forth in its entirety herein.

The use of the terms “a” and “an” and “the” and similar referents in the context of describing the invention (especially in the context of the following claims) is to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for extruding a confectionery, the method comprising:

supplying a plurality of ingredients to a planetary roller extruder;

mixing said plurality of ingredients to form a confectionery composition in said planetary roller extruder;

removing moisture from said confectionery composition during said mixing within said planetary roller extruder;

forming crystals in said confectionery composition while said confectionery composition is in said planetary roller extruder, wherein forming crystals in said confectionery composition occurs as a result of mechanical shear generated by said planetary roller extruder when said confectionery composition is at a given temperature; and outputting said confectionery composition from said planetary roller extruder, wherein said confectionery composition output comprises 1 to 9% moisture, and wherein the confectionary composition is a soft, chewy candy or a hard candy.

2. The method according to claim 1, wherein no additional sizing of the confectionery composition occurs after being output from said planetary roller extruder.

3. The method according to claim 1, further comprising: supplying said confectionery composition output from said planetary roller extruder directly to a packaging station.

4. The method according to claim 3, wherein no additional treatment of the confectionery occurs after being output from said planetary roller extruder.

5. The method according to claim 1, further comprising: aerating said confectionery composition within said planetary roller extruder to control a density thereof.

6. The method according to claim 5, wherein said density of said confectionery composition is less than or equal to about 0.8 g/cc.

7. The method according to claim 5, wherein aerating said confectionery composition includes inputting a stream of gas into said confectionery composition.

8. The method according to claim 1, further comprising heating said confectionery composition within said planetary roller extruder.

9. The method according to claim 8, wherein said cooling said confectionery composition occurs downstream from said heating said confectionery composition.

10. The method according to claim 1, wherein the confectionery is configured as one of a plurality of layers of a multilayer confectionery, and combining the confectionery with another of said plurality of layers of said multilayer confectionery occurs before the confectionery is exposed to an atmosphere.

11. The method according to claim 1, wherein an elapsed time between supplying said plurality of ingredients to said planetary roller extruder and outputting said confectionery composition from said planetary roller extruder is less than 20 minutes.

12. The method of forming a confectionery according to claim 1, wherein said confectionery composition is a first confectionery composition, the method further comprising:

outputting a second confectionery composition from said planetary roller extruder following said outputting of said first confectionery composition, said second confectionery composition being output absent any formation of crystals.

13. A method for extruding a confectionery, the method comprising:

supplying a plurality of ingredients to a planetary roller extruder;

mixing said plurality of ingredients to form a confectionery composition in said planetary roller extruder;

removing moisture from said confectionery composition during said mixing within said planetary roller extruder;

forming crystals in said confectionery composition while said confectionery composition is in said planetary roller extruder; and outputting said confectionery composition from said planetary roller extruder, wherein the method is conducted without the use of a pulling mechanism; and wherein the confectionary composition is a crystallized, non-aerated chewy candy.

14. The method according to claim 13, wherein no additional sizing of the confectionery composition occurs after being output from said planetary roller extruder.

15. The method according to claim 13, further comprising:

supplying said confectionery composition output from said planetary roller extruder directly to a packaging station, wherein no additional treatment of the confectionery occurs after being output from said planetary roller extruder.

16. The method according to claim 13, wherein forming crystals in said confectionery composition occurs as a result of mechanical shear generated by said planetary roller extruder when said confectionery composition is at a given temperature.

17. The method according to claim 16, further comprising heating said confectionery composition within said planetary roller extruder wherein said cooling said confectionery composition occurs downstream from said heating said confectionery composition.

18. The method according to claim 13, wherein the confectionery is configured as one of a plurality of layers of a multilayer confectionery, and combining the confectionery with another of said plurality of layers of said multilayer confectionery occurs before the confectionery is exposed to an atmosphere.

19. The method of claim 13, wherein planetary roller extruder is less than or equal to fifteen meters in length and said confectionery composition is output from said planetary roller extruder at a rate of at least one ton per hour.

20. The method according to claim 1, wherein the removing moisture from said confectionery composition during said mixing within said planetary roller extruder is absent any boiling of said plurality of ingredients.

* * * * *